Sheet 1, 2 Sheets.
J. G. Perry.
Combined Rake & Tedder.
Nº 88,899.      Patented Apr. 13, 1869.
Fig. 1
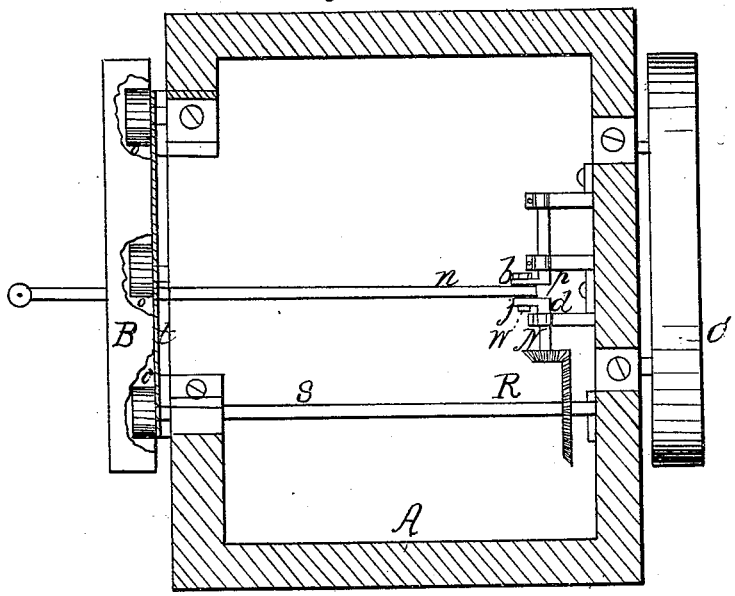
Fig. 2           Fig. 3
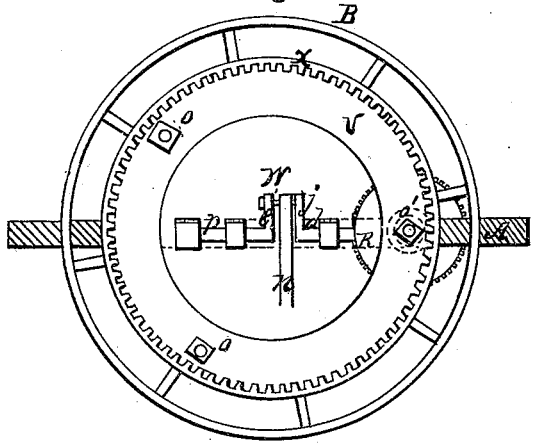 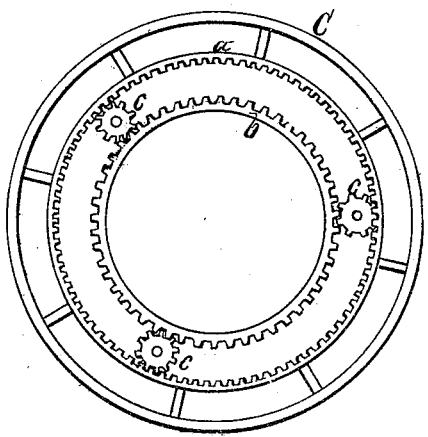
Witnesses          Inventor
Elisha J. Clarke      John G. Perry
C. E. Thomas J. G. Perry.
Combined Rake & Tedder.
No. 88,899. Patented Apr. 13, 1869.

Witnesses:
Elisha J. Clarke
C. E. Thomas

Inventor:
John G. Perry

UNITED STATES PATENT OFFICE.

JOHN G. PERRY, OF KINGSTON, RHODE ISLAND.

IMPROVEMENT IN COMBINED MOWING-MACHINE AND HAY-SPREADER.

Specification forming part of Letters Patent No. 88,899, dated April 13, 1869.

*To all whom it may concern:*

Be it known that I, JOHN G. PERRY, of Kingston, in the county of Washington and State of Rhode Island, have invented certain Improvements in Combined Harvesters and Hay-Tedders; and do hereby declare the following to be a full and correct description thereof, reference being had to the accompanying drawings, making part of this specification, and to the letters and numbers of reference marked thereon, similar letters and numbers being used in all the figures to denote the same part.

Figure 4:
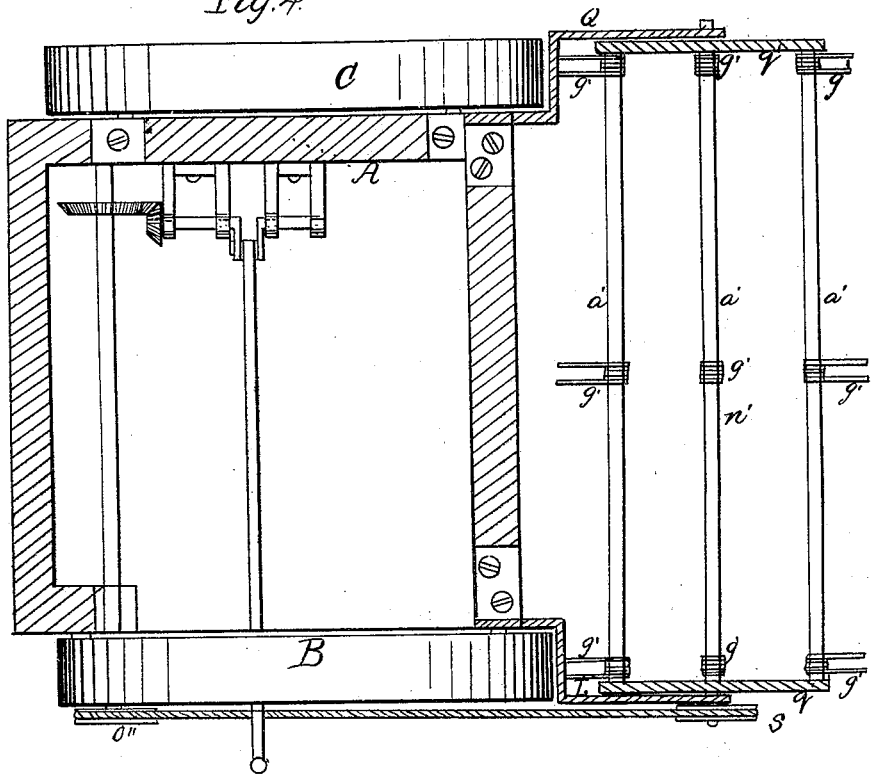
Figure 5:
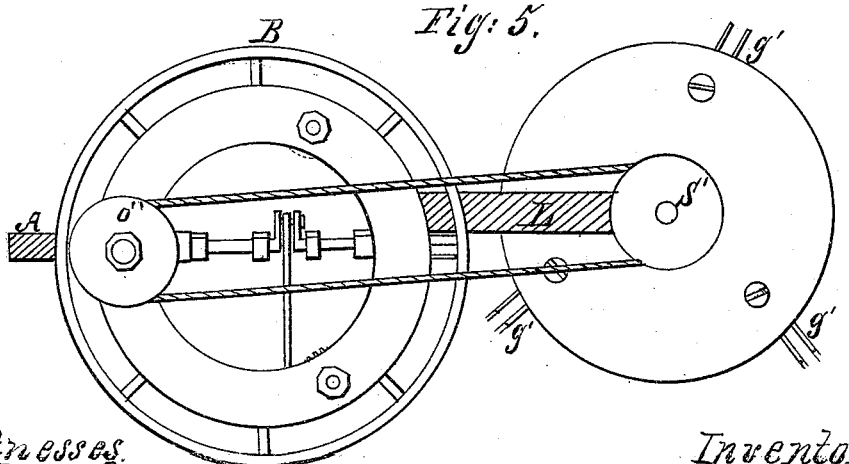

In these drawings, Figure 1 is a top view of the frame and wheels. Figs. 2 and 3 are side elevations of the wheels. Fig. 4 is a top view of the frame with the tedder. Fig. 5 is a side elevation of the same.

These improvements consist in making a more perfect bearing for the open center wheel to turn on to avoid the friction incident to so large a bearing, and in combining a tedder with the mower to stir one swath of grass while another is being cut.

The construction is as follows: A is the frame of the machine. C is one of the driving-wheels, and B represents another driving-wheel, with a variation in the way of making the bearing.

$a$ is the ring that forms the inside or bearing part of the wheel, and has gear-teeth on its inner surface. $b$ is another ring, having teeth on its outer face, and which is fastened to the frame A. $c\ c\ c$ are small gear-wheels, placed between the two rings $a$ and $b$, and meshing into both of them. These small gear-wheels act as friction-rolls between the rings $a$ and $b$, the teeth being used upon them to keep them at a certain distance from each other, and they may be made with spiral teeth to give a smoother bearing.

In the other wheel, B, the bearing consists of small gear-wheels $o\ o\ o'$ on stationary pivots, excepting one, which is on the shaft $s'$ that drives the crank. The pivots of these wheels $o\ o\ o'$ are fastened to the plate $t$, which is secured to the frame A. Another plate, $v$, is put outside of the wheels $o\ o\ o'$, and held on in place by nuts on the ends of the pivots which pass through them. The ring $x$ of wheel B has gear-teeth on its inner surface, which drive the shaft S and bevel-gear wheels R and N.

The crank is made in two parts, as follows: The crank-arm $j$ is fast to the end of the short shaft $d$, and has the crank-pin $w$ in its outer end made long enough to reach through the head of the connecting-rod $n$ and the arm $l$, which is also secured to the end of a short shaft, $p$. A nut is put on the end of the crank-pin to screw the arm $l$ fast to the pin. This keeps the connecting-rod on the pin, and at the same time gives a support to the end of the crank-pin, the nut not being liable to work loose and come off.

The attachment of the tedder is as follows: The two arms Q and L are secured to the back part of the frame A, Fig. 4, and have bearings in their outer ends to receive the shaft $n'$ of the tedder. The two heads $q'\ q'$ are fast to the shaft, and hold the ends of the bars $a'\ a'\ a'$, which carry the teeth or forks $g'\ g'$, which stir the grass as they revolve. The tedder-shaft has a pulley, $s'$, on one end, which receives motion from a pulley, $o''$, on the end of the shaft S.

Having described my improvements, what I claim as my invention is—

1. Running the open wheel C on gear-rolls, substantially as and for the purpose set forth.

2. Running wheel B on pivoted gear-wheels, substantially as and for the purpose set forth.

3. Combining a hay-tedder with a mowing-machine.

JOHN G. PERRY.

Witnesses:
 ELISHA C. CLARKE,
 C. E. THOMAS.